Jan. 16, 1940.  N. L. ALISON  2,187,069
VARIABLE-SPEED HYDRAULIC COUPLING
Filed April 24, 1937  3 Sheets-Sheet 1

INVENTOR.
NORH L. ALISON
BY
ATTORNEY.

Jan. 16, 1940.   N. L. ALISON   2,187,069
VARIABLE-SPEED HYDRAULIC COUPLING
Filed April 24, 1937   3 Sheets-Sheet 2

INVENTOR.
NOAH L. ALISON
BY
ATTORNEY.

Jan. 16, 1940.                N. L. ALISON                2,187,069
                   VARIABLE-SPEED HYDRAULIC COUPLING
                      Filed April 24, 1937        3 Sheets-Sheet 3
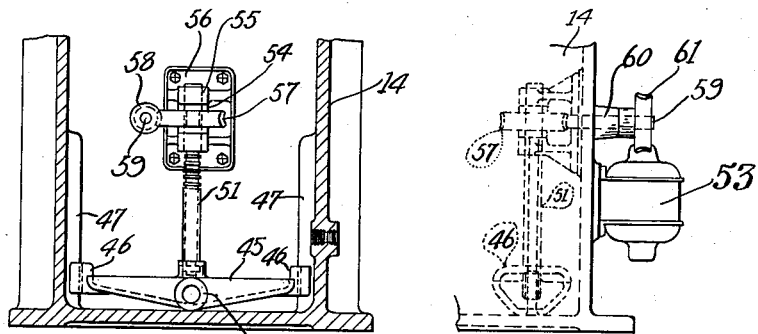
Fig.3            Fig.4
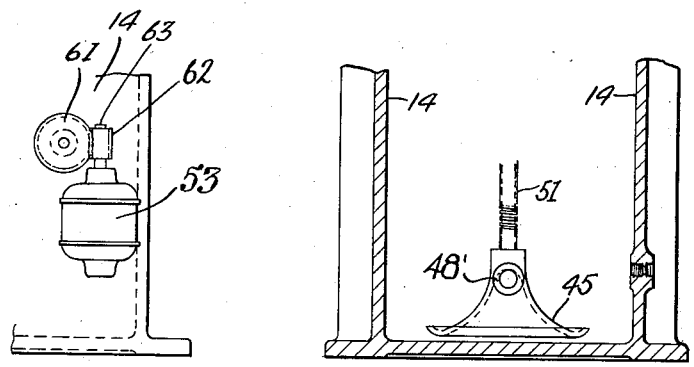
Fig.5            Fig.6
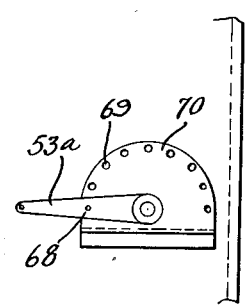   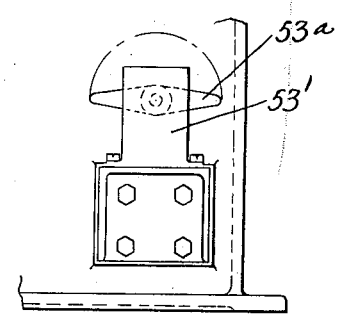
Fig.7            Fig.8
INVENTOR.
NORH L. ALISON
BY
                    ATTORNEY.

Patented Jan. 16, 1940

2,187,069

UNITED STATES PATENT OFFICE 2,187,069

VARIABLE-SPEED HYDRAULIC COUPLING

Noah Lester Alison, Detroit, Mich., assignor to American Blower Corporation, Detroit, Mich., a corporation of Delaware Application April 24, 1937, Serial No. 138,782

8 Claims. (Cl. 60—54)

My invention relates to hydraulic couplings. One of the primary objects of my invention is to provide a means for evacuating the liquid from the coupling very rapidly in order to give flexibility of control of any mechanism in which this coupling is employed.

For instance, in submarine use, this dumping means of my invention is particularly adaptable because it enables the submarine to submerge by rapid dumping so that submerging can take place within at least three seconds. This coupling is used in the driving mechanism for propelling the submarine.

Another object of my invention is to eliminate the scoop tube construction heretofore employed in couplings.

It is a further object of my invention to provide means whereby the dumping rate, that is the rate of evacuating of the liquid from the coupling, is proportional to the drive shaft speed as the fluid pump is driven from the driving shaft.

It is a further object to utilize the leakoff port of the coupling and to utilize in connection therewith, as an adjustable receiver or plate from which the liquid is dumped in order to increase the rapidity of dumping.

It is a further object of the invention to supply oil for the coupling from a tank to the coupling by means of a pump associated with means of position control for controlling the level of the oil in the tank which in turn controls the amount of oil in the coupling.

It is my object to provide an impeller and an impeller casing which is attached to the primary or driving shaft and rotates with it, and to provide in connection with it a runner attached to the driven shaft and enclosed by means of the impeller casing.

It is my object to provide an association therein with a stationary housing around the above mentioned rotating parts with a manifold on the driven side through which the oil is delivered to the coupling and which also supports the drive shaft on suitable bearings.

It is my object to provide a bearing housing for the shafts in the casing; and a continuously operating oil pump which delivers oil from the oil tank, formed by this stationary housing, to the coupling and means for regulating the amount of oil that can be supplied to the coupling from this oil tank.

It is my object to provide an air separator in the pump discharge to eliminate air that may be entrained in the pump suction due to the fact that the pump may handle less than its full quota of oil.

It is a further object to remove oil from the coupling by means of leakoff nozzles which discharge into the housing enclosing the coupling, whereby the speed of deceleration is determined by the size of these nozzles and the speed of acceleration can be determined by the capacity of the pump.

It is a further object to eliminate the necessity of pumping at high pressures in the oil circulating pipes to overcome the pressure drop through an oil cooler, which has been heretofore characteristic of some types of coupling.

Referring to the drawings:

Figure 3 is a section through the bottom of the casing constituting an oil tank showing one of the methods of elevating the dumping plate.

Figure 4 is a detailed side elevation of the driving motor and a part of the casing showing the arrangement of the motor for driving the mechanism for raising and lowering the dumping plate.

Figure 5 is a front elevation of Figure 4.

Figure 6 is a view of a modification of the dumping plate.

Figure 7 is an elevation showing the arrangement of the quadrant and lever for end control of the dumping plate. This lever is also used for a connection to an automatic control.

Figure 8 is an elevation in detail of the operating motor and handle for operating the dumping plate.

Figure 1:
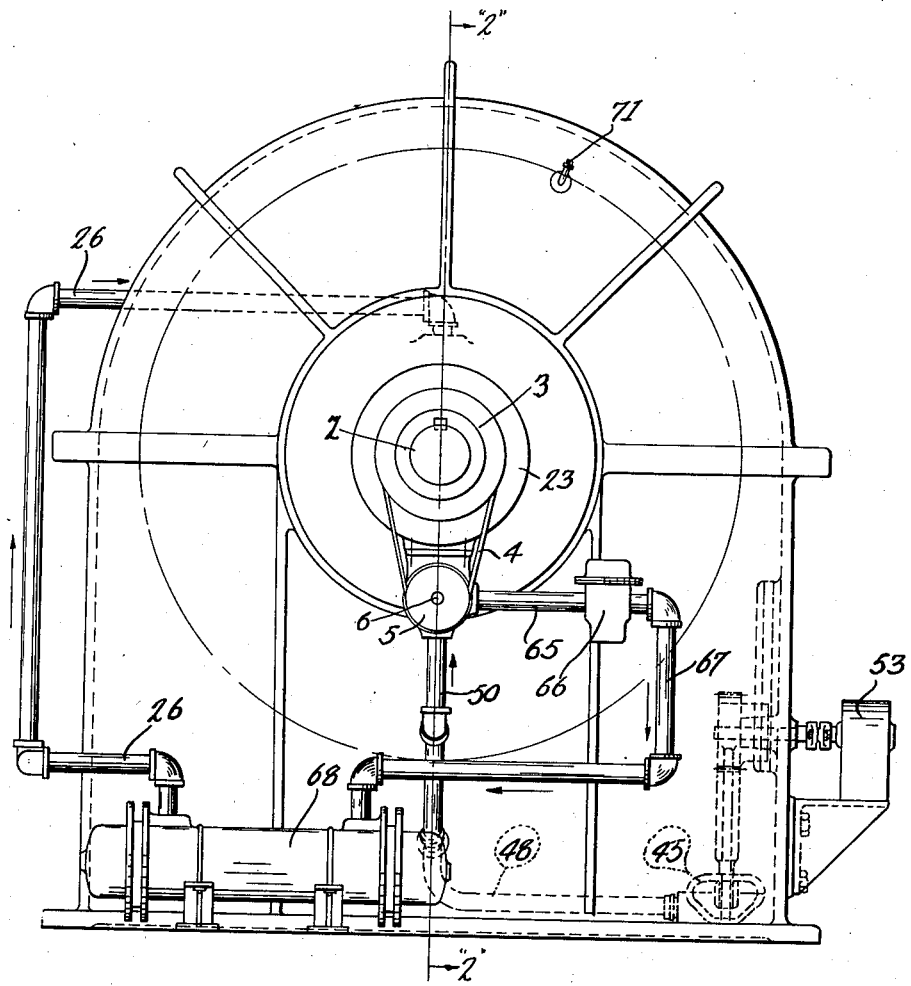
Figure 1 is a side elevation from the driving side showing the arrangement of the coupling housing, pump, oil cooler and aerator with the connecting coupling removed.

Referring to the drawings in detail, 1 is a mechanical coupling of the end of the drive shaft 2 for connecting the drive shaft to some suitable prime mover. Mounted on this shaft 2 is a driving pulley 3 which, through a belt 4 drives a driven pulley 5 on the shaft 6 of a continuous running oil pump 9 which preferably is an efficient gear pump.

The drive shaft 2 is mounted at its outer ends in oppositely disposed tapered roller bearings, which are both radial and thrust bearings. These radial and thrust roller bearings are designated 10. The inner end of the shaft is mounted within a roller radial bearing 11. The two bearings are spaced apart from each other by a sleeve 12. Both bearings have their outer races mounted within the hollow hub 13, which is mounted upon the side wall 14 of the casing for the coupling. The shaft 2 is provided with a shoulder 14' for engaging with the inner race of the bearing 11. The outer race of the bearing 11 is retained against a shoulder or the hub 13, and by a plate 15. The inner race of the bearing 10 is retained by a threaded nut 16 mounted on the shaft 2. In this manner the bearings are spaced on the shaft 2 and adjustably held in position, and they also serve to position the shaft 2 with respect to the casing through being positioned in the hub 13.

Mounted on the extreme inner end of the shaft 2 is the impeller 17 and the impeller casing 18, which are bolted together by a series of peripherally arranged bolts 19.

The impeller 17 is retained on the shaft 2 by the nut 20 mounted upon the threaded end 21 of the shaft 2 which retains the hub 22 of the impeller 17 against the shoulder 14' of the shaft 2. In order to close the opening of the hub 13 surrounding shaft 2 a cap plate 23 is provided.

Figure 2:
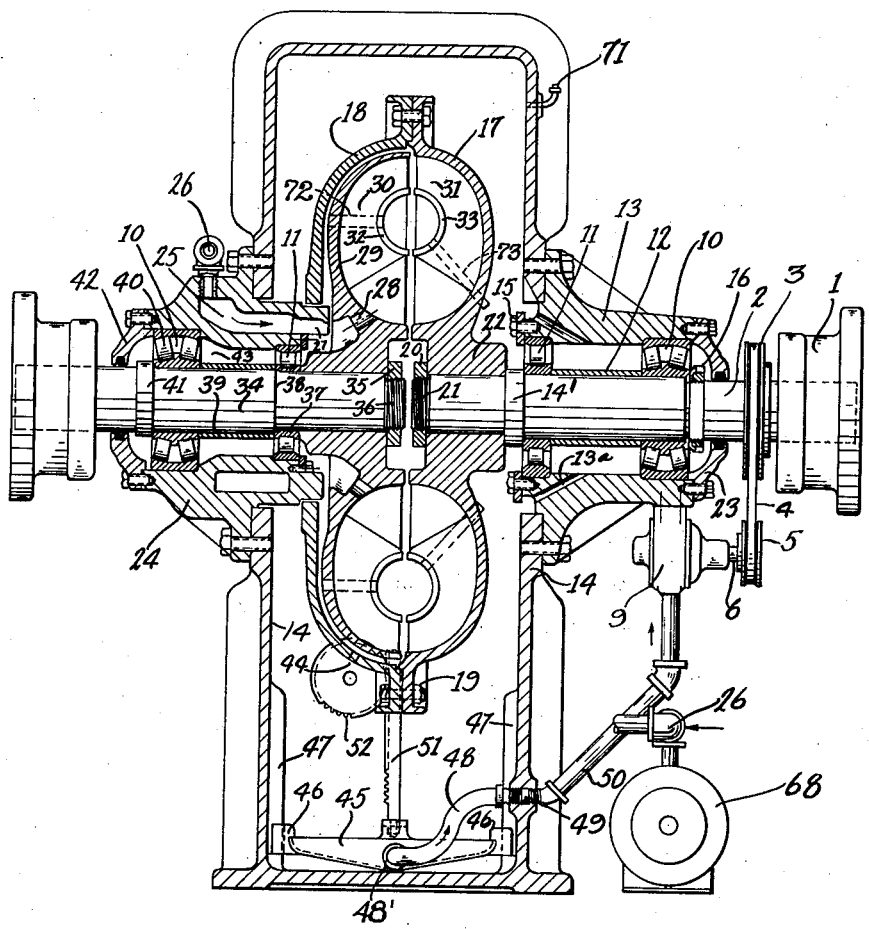
Figure 2 is a section of the line 2—2 of Figure 1 looking in the direction of the arrows.
Figure 9:
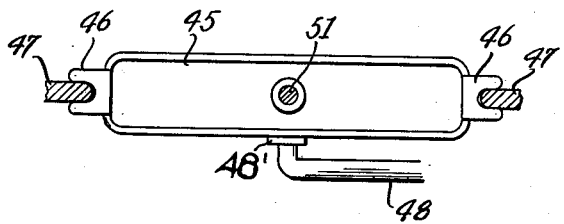
Figure 9 is a deailed view at large of the lower end of the coupling of Figure 2 showing the leakoff nozzle.

On the other side of the casing 14 there is provided a hollow hub 24 having an inlet passage-way 25 connected to the inlet pipe 26. This passage-way 25 discharges at 27 within the impeller casing 18 and adjacent the inner inlet passage-way 28 of the runner 29. The runner 29 is provided with a series of buckets 30, as is the impeller 17 with a series of buckets 31 of the usual character. These buckets are provided with the opposite halves of a core ring designated respectively 32 and 33. The runner is mounted upon the driven shaft 34 with a nut 35 on the threaded end 36 of the shaft 34. This runner abuts against the inner race of the roller radial bearing 37, the other side of which abuts against the shoulder 38 on the shaft 34. A sleeve 39 surrounds the shaft 34 and engages with the inner race of the outer roller radial and thrust bearing 40 which supports the outer end of the shaft 34, its outer race engages with the shoulder 41 on the shaft 34. The usual end plate 42 surrounds the shaft and closes the chamber 43 within the hub 24 in which the shaft rotates. A mechanical coupling is mounted on the shaft 34 to connect it to some suitable piece of mechanism. The hub 13 is provided with oil passage-ways 13a which communicates with the chamber in which the shaft 2 rotates in the hub 13. The passageway 13a receives oil from the interior of hub 13 which is supplied with oil through the passageway connecting the housing enclosure of the coupling with the interior of hub 13 as illustrated in Fig. 2.

The impeller casing 18 is provided with a leak-off nozzle 44, the function of which will be hereinafter described. In the bottom of the casing 14, which forms an oil reservoir, there is mounted a vertically moving dumping plate 45 which is relatively long and narrow. It is provided with guide shoes 46 at either end which ride upon vertically disposed guide ribs 47 on the inside of the casing 14.

This dumping plate 45 is connected by a flexible hose 48 attached to the dumping plate at 48' to a port 49 in the wall of the casing 14 to which is also connected the pipe 50 which in turn is connected to the pump 9. The plate 45 is properly denominated an adjustable oil weir.

This dumping plate or oil weir is connected by a rack 51 to a pinion 52 which in turn is actuated by a motor 53 for raising or lowering the dumping plate so as to vary the amount of oil supplied to the coupling. There are various ways of manually, or through an electric or other motor, raising or lowering this weir 45.

In Figures 3 and 4, I have shown one form in which the driving means 51 is a screw working within a block 54 held between the arms 55 of the plate 56 on the inside of the casing 14. Mounted on this block 54 is a worm gear 57 meshing with a worm 58 on a shaft carried within the bearing sleeve 60 of the casing 14. The outer end of this shaft 58 carries a worm gear 61 engaging with a worm 62 that is mounted on the armature shaft 63 of a motor 53. The motor 53 may be attached to the casing 14 by means of a bracket 51' and operate through an arm 53a if desired.

Where it is desired to have the oil withdrawn from the reservoir at a point substantially above the bottom, an arrangement such as shown in Figure 6 may be employed.

The pump 9 is connected to a pipe 65 which contains an aerator 66 which is in turn connected by the pipe 67 to the oil cooler 68 which is connected to the pipe 26 that feeds oil to the passage-way 25 of the hub 24.

When a manually operated means is employed for raising and lowering the weir or dumping plate 45, the handle 53a used for that purpose may be positioned by inserting a pin in the hole 68, or any one of the holes 69 of the quadrant plate 70. 71 designates an air vent for the casing and 72 designates an air vent for the coupling.

A brief description of the operation of the coupling, with reference to Figures 1 and 2, is as follows. Starting with the oil reservoir in the bottom of the casing 14 approximately full of oil and the dumping plate arranged near the bottom of the reservoir, the impeller is started and brought up to full speed. Power is transmitted with minimum "slip" from the driving shaft to the driven shaft 34 through the hydraulic coupling between the impeller 17 and the runner 29. The dumping plate or weir 45 is then adjusted vertically to the height required, so that only enough oil is supplied to the coupling by means of the pump 9 to produce the desired "slip" or relative speed between the driving and driven shafts of the coupling. In this connection, it is well known the relative speed between the driving and driven members of the coupling depends upon the quantity of oil therein. To reduce the speed of the driven shaft it is therefore necessary simply to cut down the amount of oil supplied to the working chamber of the coupling.

When the impeller 17 is rotating, oil or other suitable liquid is constantly passing at a predetermined rate from the working chamber of the coupling between the impeller and runner. A certain amount of liquid is constantly being thrown out of the coupling through the periphery openings and leak off ports 73 and nozzle opening 44 into the reservoir located at the bottom part of the casing 14. The aperture of the leak off nozzle port 44 is of predetermined size and substantially determines the speed of deceleration of the coupling as mentioned on page 1, column 2.

The constant loss of liquid from the coupling is being continuously replaced through the feed pipe 26 by means of the constantly running pump drawing oil from the reservoir and forcing it through the de-airer 66, pipe 67, cooler 68, pipe 26, inlet passageway 25 and to the working chamber of the coupling.

Assuming for illustration purposes the coupling is operating at constant speed and the liquid loss is being continuously replaced so that the working chamber is supplied with the requisite amount of liquid and the driven shaft is subjected to increased load, the "slip" will increase with a corresponding decrease in runner speed. This results in decreasing the centrifugal force in the working chamber of the coupling so that the rate at which the liquid is thrown out through the periphery ports of the coupling is somewhat reduced. The amount of liquid supplied to the coupling, however, remains constant by reason of the constant speed running pump 9; ultimately then the speed of the coupling will become stable at a reduced speed corresponding to the quantity of liquid supplied to the working chamber of the coupling and the load transmitted by the driven shaft. The adjustment of the dumping plate 45, manually or otherwise, merely limits the quantity of working liquid that can be supplied through the coupling, whereas by varying the capacity of the pump 9 and the size of the leak off port openings, the rate of acceleration and deceleration, respectively, can be varied.

It will be understood that I desire to comprehend within my invention such modifications as may be clearly embraced within the claims and scope of my invention.

Having thus fully described my invention, what I claim as new and desire to secure by Letters Patent is:

1. In combination, a hydraulic coupling comprising an impeller, a driving shaft, a runner, a driven shaft and a housing for said coupling having supporting sleeves for said shafts and spaced bearings interposed within said sleeves for supporting said shafts at spaced points radially and against longitudinal thrust, means in said sleeves for circulating oil therethrough from said coupling over said spaced bearings.

2. In combination, a hydraulic coupling comprising an impeller, a driving shaft, a runner, a driven shaft, a housing for said coupling having supporting sleeves for said shafts and spaced bearings interposed within said sleeves for supporting said shafts at spaced points radially and against longitudinal thrust, said bearings comprising radial inboard bearings and combination radial and thrust outboard bearings, means in said sleeves for circulating oil therethrough from said coupling over said spaced bearings.

3. In combination, a hydraulic coupling comprising an impeller, a driving shaft, a runner, a driven shaft, a housing for said coupling having supporting sleeves for said shafts and spaced bearings interposed within said sleeves for supporting said shafts at spaced points radially and against longitudinal thrust, said bearings comprising radial inboard bearings and combination radial and thrust outboard bearings, and means on each shaft adapted to space and separate said bearings and means on each shaft for engaging with said bearings to maintain them against said spacing means and to cooperate in maintaining the position of said shafts longitudinally with respect to said bearings, and means in said sleeves for circulating oil therethrough from said coupling over said spaced bearings.

4. In combination, a housing for a hydraulic coupling having oppositely disposed bearing sleeves, a coupling comprising a driving and driven shaft with an impeller and runner mounted thereon respectively, bearings between said shafts and said sleeves, said bearings being spaced from one another, an oil delivery manifold mounted within one of said sleeves for delivering oil to said coupling and to some of said bearings and means in the other sleeve for circulating oil therethrough from said coupling over said bearings.

5. In combination, a housing for a hydraulic coupling having oppositely disposed bearing sleeves, a coupling comprising a driving and driven shaft with an impeller and runner mounted thereon respectively, bearings between said shafts and said sleeves, said bearings being spaced from one another, an oil delivery manifold mounted within one of said sleeves for delivering oil to said coupling and to some of said bearings, means in the other sleeve for circulating oil therethrough from said coupling over said bearings, and means in the bottom of said housing for collecting oil from said coupling and said bearings and returning it to the coupling and the bearings.

6. In combination, a housing for a hydraulic coupling having oppositely disposed bearing sleeves, a coupling comprising a driving and driven shaft with an impeller and runner mounted thereon respectively, bearings between said shafts and said sleeves, said bearings being spaced from one another and an oil delivery manifold mounted within one of said sleeves for delivering oil to said coupling and to some of said bearings, means in the other sleeve for circulating oil therethrough from said coupling over said bearings, means in the bottom of said housing for collecting oil from said coupling and said bearings and returning it to the coupling and the bearings, and means of adjusting the quantity of oil so returned.

7. In combination, a hydraulic coupling, a housing for receiving discharge therefrom through leakoff nozzles, means for adjusting the position of a weir in said housing for varying the amount of oil removed therefrom, a pump for removing said oil and returning it to the coupling, an air separator between said pump and said coupling, and an oil cooler between said air separator and said coupling.

8. In combination, a hydraulic coupling having leakoff nozzles, a housing inclosing said coupling and having a reservoir portion below the coupling for receiving discharge therefrom through said leakoff nozzles, a weir located in said housing reservoir portion below the coupling, means for adjusting the vertical position of the weir in said housing for varying the amount of oil removed therefrom, means connected to said weir for returning the oil to the coupling, and a pump located in said return means to cause the return of the oil from the weir back to the coupling.

NOAH LESTER ALISON.